US012801720B2

(12) United States Patent
Zhou et al.

(10) Patent No.: US 12,801,720 B2
(45) Date of Patent: Nov. 17, 2026

(54) PRIVACY COMPUTING SYSTEM, METHOD, APPARATUS, DEVICE AND MEDIUM

(71) Applicant: CHINA UNIONPAY CO., LTD., Shanghai (CN)

(72) Inventors: Yongkai Zhou, Shanghai (CN); Gaolei Zhang, Shanghai (CN); Qi Wang, Shanghai (CN); Yuanjian Zhang, Shanghai (CN); Pengfei Gao, Shanghai (CN); Yanming Yang, Shanghai (CN); Shuo He, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 11 days.

(21) Appl. No.: 18/994,518

(22) PCT Filed: Dec. 7, 2022

(86) PCT No.: PCT/CN2022/137368

§ 371 (c)(1),
(2) Date: Jan. 14, 2025

(87) PCT Pub. No.: WO2024/011827

PCT Pub. Date: Jan. 18, 2024

(65) Prior Publication Data

US 2026/0111532 A1 Apr. 23, 2026

(30) Foreign Application Priority Data

Jul. 15, 2022 (CN) ......................... 202210837745.8

(51) Int. Cl.

| | |
|---|---|
| ***H04L 29/06*** | (2006.01) |
| ***G06F 9/54*** | (2006.01) |
| ***G06F 21/44*** | (2013.01) |

(52) U.S. Cl.
CPC .............. *G06F 21/44* (2013.01); *G06F 9/547* (2013.01)

(58) Field of Classification Search
CPC ..... G06F 21/44; G06F 9/547; H04L 63/0823; H04L 63/083
See application file for complete search history.

(56) References Cited

U.S. PATENT DOCUMENTS

| | | | | |
|---|---|---|---|---|
| 10,574,699 B1 * | 2/2020 | Baer | .................... | G06F 21/6218 |
| 11,095,612 B1 * | 8/2021 | Oswal | ................. | H04L 63/1416 |

(Continued)

FOREIGN PATENT DOCUMENTS

| | | |
|---|---|---|
| CN | 112989411 A | 6/2021 |
| CN | 113591113 A | 11/2021 |

(Continued)

OTHER PUBLICATIONS

Jianxin Zhao et al., Privacy-Preserving Machine Learning Based Data Analytics on Edge Devices, Dec. 27, 2018, ACM, pp. 341-346. (Year: 2018).*

(Continued)

*Primary Examiner* — Luu T Pham
*Assistant Examiner* — Fahimeh Mohammadi
(74) *Attorney, Agent, or Firm* — Anova Law Group, PLLC

(57) ABSTRACT

The disclosure provides a a privacy computing method, including that, when first computing data is obtained after corresponding computation is performed on the basis of a first sub-algorithm in a privacy algorithm on to-be-processed data, and when it is determined that the first computing data needs to be recomputed on the basis of a second sub-algorithm in the privacy algorithm, where the second sub-algorithm is stored in another privacy computing device, a proxy API corresponding to the first sub-algorithm and a (Continued)

proxy API corresponding to the second sub-algorithm are determined according to a pre-stored correspondence between sub-algorithms and proxy APIs. The first computing data is sent, by means of the proxy API corresponding to the first sub-algorithm, to the proxy API corresponding to the second sub-algorithm, such that the other privacy computing device performs corresponding computation on the first computing data based on the second sub-algorithm.

20 Claims, 5 Drawing Sheets

(56) References Cited

U.S. PATENT DOCUMENTS

| | | | | |
|---|---|---|---|---|
| 2007/0177740 | A1* | 8/2007 | Nakajima | G06F 21/6218<br>380/277 |
| 2009/0089393 | A1* | 4/2009 | Yi | H04L 67/289<br>709/211 |
| 2016/0044005 | A1* | 2/2016 | Phegade | H04L 63/0428<br>726/3 |
| 2020/0004973 | A1* | 1/2020 | Li | H04L 9/0643 |
| 2020/0220851 | A1* | 7/2020 | Storm | G06F 17/16 |
| 2020/0267008 | A1* | 8/2020 | Chen | H04W 4/24 |
| 2021/0192068 | A1* | 6/2021 | Rogers | G06F 21/6227 |
| 2022/0100583 | A1* | 3/2022 | Lal | G06F 9/5083 |
| 2022/0353295 | A1* | 11/2022 | Yeh | G06F 16/245 |
| 2023/0053566 | A1* | 2/2023 | Horne | G06F 21/6227 |
| 2023/0081395 | A1* | 3/2023 | Rojas Fonseca | G06F 8/63<br>719/328 |
| 2023/0107510 | A1* | 4/2023 | Chalk | G06F 21/602<br>713/193 |
| 2025/0202883 | A1* | 6/2025 | Cicchitto | H04L 63/083 |

FOREIGN PATENT DOCUMENTS

| | | |
|---|---|---|
| CN | 114676408 A | 6/2022 |
| CN | 115310145 A | 11/2022 |

OTHER PUBLICATIONS

Jun Wu et al., Big Data Analysis-Based Secure Cluster Management for Optimized Control Plane in Software-Defined Networks, Mar. 2018, IEEE, vol. 15, Issue: 1, pp. 27-38. (Year: 2018).*

Yong Li et al., Privacy-Preserving Federated Learning Framework Based on Chained Secure Multiparty Computing, Apr. 15, 2021, IEEE, vol. 8, Issue: 8, pp. 6178-6186. (Year: 2021).*

Guangjun Wu et al., Blockchain-Enabled Privacy-Preserving Access Control for Data Publishing and Sharing in the Internet of Medical Things, Jun. 1, 2022, IEEE, vol. 9, Issue: 11, pp. 8091-8104. (Year: 2022).*

The World Intellectual Property Organization (WIPO) International Search Report for PCT/CN2022/137368 Mar. 21, 2023 5 Pages (including translation).

* cited by examiner

PRIVACY COMPUTING SYSTEM, METHOD, APPARATUS, DEVICE AND MEDIUM

CROSS-REFERENCE TO RELATED APPLICATION

This application is a national phase entry under 35 U.S.C. § 371 of International Application No. PCT/CN2022/137368, filed on Dec. 7, 2022, which claims priority to Chinese Patent Application No. 202210837745.8, entitled "PRIVACY COMPUTING SYSTEM, METHOD, APPARATUS, DEVICE AND MEDIUM," filed on Jul. 15, 2022, the entire content of all of which is incorporated herein by reference.

FIELD OF THE DISCLOSURE

The disclosure generally relates to the field of data security technology and, more particularly, relates to a privacy computing system, method, apparatus, device and medium.

BACKGROUND

Privacy computing (or privacy compute) refers to a collection of technologies that realize data analysis and computation on the premise of protecting the data from being leaked to the outside world, to achieve the objective of "available but invisible data", which then allows to achieve data value transformation and release on the premise of full data and privacy security protection.

With the increasing awareness of data protection in the relevant fields and the tightening of privacy regulatory policies, privacy computing has received widespread attention in the relevant fields due to its "available but invisible" feature. Many technology companies have launched their own privacy computing products with specific field-related features. A large variety of privacy computing products have enriched market choices and also brought new challenges. For example, privacy computing products launched by different technology companies are usually designed and implemented based on different system platforms. When the privacy computing products of different system platforms are stored in different privacy computing devices, it is generally impossible to complete the interaction of information between privacy computing products of different system platforms, which then turns "data islands" into "computing islands". In addition, even if the same privacy computing product is launched by the same technology company, when the same privacy computing product is stored in different privacy computing devices, the interaction of information between the same privacy computing product in different devices is usually impossible, which also turns a "data island" into a "computing island".

Therefore, the problem of interconnection and interoperability between privacy algorithm products stored in different privacy computing devices has become an absolute pain point in the relevant fields. How to achieve interconnection and interoperability between privacy algorithm products stored in different privacy computing devices is a technical problem that needs to be urgently addressed currently.

SUMMARY

The disclosure provides a privacy computing system, method, apparatus, device and medium for realizing interconnection and interoperability between privacy algorithm products stored in different privacy computing devices.

In a first aspect, the disclosure provides a privacy computing system, which includes: a first privacy computing device and at least one second privacy computing device; where the first privacy computing device and each second privacy computing device collaborate on privacy computing tasks based on management plane interoperability, and execute the privacy computing tasks based on data plane interoperability, where the management plane interoperability and the data planes interoperability are mutually independent; for each second privacy computing device, when the first privacy computing device and the second privacy computing device perform the management plane interoperability, the first privacy computing device is configured to send a first query request to the second privacy computing device, where the first query request carries first identification information of the first privacy computing device and second identification information of a to-be-queried sub-algorithm; the second privacy computing device is configured to receive the first query request, and when it is determined that the first identification information is located in stored identification information for compliance devices, send stored information for components included in the sub-algorithm with the second identification information to the first privacy computing device; the first privacy computing device is further configured to the receive the information for components included in the sub-algorithm with the second identification information, and send, to the second privacy computing device, a loading request for loading the components included in the sub-algorithm with the second identification information; and the second privacy computing device is further configured to receive the loading request, load the components included in the sub-algorithm with the second identification information, and after the loading is successful, send a loading success message to the first privacy computing device.

In a second aspect, the disclosure provides a privacy computing method, which method is applied to a first privacy computing device, and the method includes: when performing management plane interoperability with a second privacy computing device, sending a first query request to the second privacy computing device, where the first query request carries first identification information of the first privacy computing device and second identification information of a to-be-queried sub-algorithm, and the first privacy computing device and the second privacy computing device respectively collaborate on privacy computing tasks based on the management plane interoperability, and perform the privacy computing tasks based on data plane interoperability, where the management plane interoperability and the data plane interoperability are mutually independent; and when information for components included in the sub-algorithm with the second identification information sent by the second privacy computing device is received, sending to the second privacy computing device a loading request for loading the components included in the sub-algorithm with the second identification information.

In a third aspect, the disclosure provides a privacy computing method, which method is applied to any second privacy computing device, and the method includes: when performing management plane interoperability with a first privacy computing device, receiving a first query request sent by the first privacy computing device, where the first query request carries first identification information of the first privacy computing device and second identification information of a to-be-queried sub-algorithm, and the first privacy computing device and the second privacy computing device collaborate on privacy computing tasks based on the management plane interoperability and execute the privacy computing tasks based on data plane interoperability, where the management plane interoperability and the data plane interoperability are mutually independent; when it is determined that the first identification information is located in stored identification information for compliance devices, sending to the first privacy computing device stored information for components included; and when a loading request sent by the first privacy computing device is received, loading the components included in the sub-algorithm with the second identification information, and after the loading is successful, sending a loading success message to the first privacy computing device.

In a fourth aspect, the disclosure provides a privacy computing device, which includes: a first transmission module, configured to send a first query request to a second privacy computing device when performing management plane interoperability with the second privacy computing device, where the first query request carries first identification information of the first privacy computing device and second identification information of a to-be-queried sub-algorithm, and the first privacy computing device and the second privacy computing device collaborate on privacy computing tasks based on the management plane interoperability and perform the privacy computing tasks based on data plane interoperability, where the management plane interoperability and the data plane interoperability are mutually independent; and a second transmission module, configured to, when information for components included in the sub-algorithm with the second identification information sent by the second privacy computing device is received, send to the second privacy computing device a loading request for loading the components included in the sub-algorithm with the second identification information.

In a fifth aspect, the disclosure provides another privacy computing device, which includes: a first receiving module, configured to receive a first query request sent by a first privacy computing device when performing management plane interoperability with the first privacy computing device, where the first query request carries first identification information of the first privacy computing device and second identification information of a to-be-queried sub-algorithm, and the first privacy computing device and a second privacy computing device collaborate on privacy computing tasks based on the management plane interoperability and perform the privacy computing tasks based on data plane interoperability, where the management plane interoperability and the data plane interoperability are mutually independent; a third transmission module, configured to send stored information for components included in the sub-algorithm with the second identification information to the first privacy computing device when it is determined that the first identification information is located in stored identification information for compliance devices; and a loading module, configured to load the components included in the sub-algorithm with the second identification information upon receiving a loading request sent by the first privacy computing device, and after the loading is successful, send a loading success message to the first privacy computing device.

In a sixth aspect, the disclosure provides an electronic device, which includes a processor and a memory, where the memory stores program code, and when the program code is executed by the processor, the processor is caused to execute the steps of the privacy computation methods described elsewhere herein.

In a seventh aspect, the disclosure provides a computer-readable storage medium, which includes program code. When the storage medium is run on an electronic device, the program code is configured to cause the electronic device to execute the steps of the privacy computation methods described elsewhere herein.

In an eighth aspect, the disclosure provides a computer program product. The computer program product includes: computer program code. When the computer program code is run on a computer, it causes the computer to execute the steps of the privacy computation methods described elsewhere herein.

Since the disclosure is directed to each second privacy computing device, when the first privacy computing device communicates with the second privacy computing device on the management plane, the first privacy computing device may send a first query request to the second privacy computing device. The query request carries the first identification information of the first privacy computing device and the second identification information of the to-be-queried sub-algorithm. The second privacy computing device may receive the first query request and when it is determined that the first identification information is located in the stored identification information for compliance devices, stored information for components included in the sub-algorithm with the second identification information is sent to the first privacy computing device. The first privacy computing device receives the information for components included in the sub-algorithm with the second identification information, and sends to the second privacy computing device a loading request for loading the components included in the sub-algorithm with the second identification information. The second privacy computing device may receive the loading request, load the components included in the sub-algorithm with the second identification information, and after the loading is successful, send a loading success message to the first privacy computing device. Since the first privacy computing device and each second privacy computing device of the disclosure may respectively collaborate on privacy computing tasks based on management plane interoperability, and perform privacy computing tasks based on data plane interoperability, the management plane interoperability and the data plane interoperability are mutually independent. In this way, the purpose of interconnection and interoperability between privacy algorithm products stored in different privacy computing devices may be achieved.

BRIEF DESCRIPTION OF THE DRAWINGS

In order to more clearly explain the embodiments of the present disclosure or the implementation of related technologies, the following will briefly introduce the drawings that are essential for the understanding of the embodiments or related technologies. Apparently, the drawings in the following description are merely some of the present disclosure. For those of ordinary skill in the art, other drawings may also be obtained based on these drawings.

DETAILED DESCRIPTION

In order to realize interconnection and interoperability between different privacy computing products, the disclosure provides a privacy computing system, method, apparatus, device and medium.

In order to make the purpose and implementation of the disclosure clearer, the exemplary embodiments of the disclosure will be clearly and thoroughly described hereinafter in conjunction with the accompanying drawings in the exemplary embodiments of the disclosure. Apparently, the described exemplary embodiments are merely some embodiments, rather than all of the embodiments of the disclosure.

The terms "first", "second", "third", and the like in the description and claims of the disclosure and the drawings are used to distinguish same or similar objects or entities, and do not necessarily mean to limit specific sequences or sequential order unless otherwise noted. It is to be understood that the terms so used are interchangeable under appropriate circumstances.

The terms "comprise" and "include" and any variations thereof are intended to cover but not exclusively include, for example, a product or device that includes a list of components need not be limited to all components expressly listed, but may include any component not expressly listed, and other components listed separately or inherent to these products or devices.

Further, it should be noted that the above embodiments are merely used to illustrate the technical solution of the disclosure, but not to limit the disclosure. Although the disclosure has been described in detail with reference to the disclosed embodiments, those of ordinary skill in the art should understand that the technical solutions described in these embodiments may still be modified, or some or all of the technical features may be equivalently replaced. These modifications or substitutions do not deviate the essence of the corresponding technical solutions from the scope of the technical solution of the embodiments of the present disclosure.

Embodiment 1

Figure 1:
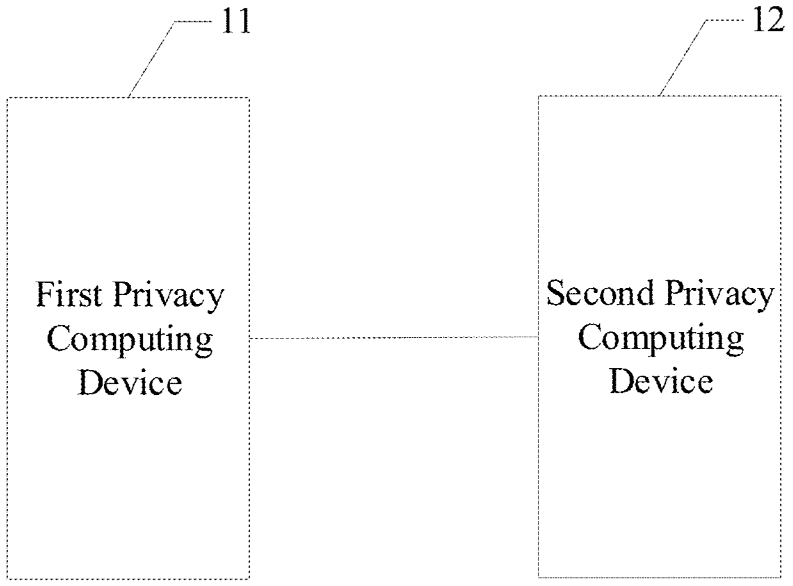
FIG. 1 shows a schematic structural diagram of a privacy computing system according to some embodiments.

FIG. 1 shows a schematic structural diagram of a privacy computing system according to some embodiments. The system includes a first privacy computing device 11 and at least one second privacy computing device 12. The first privacy computing device 11 and each second privacy computing device 12 collaborate on privacy computing tasks based on management plane interoperability, and perform the privacy computing tasks based on data plane interoperability, where the management plane interoperability and the data plane interoperability are mutually independent;

For each second privacy computing device 12, when the first privacy computing device 11 and the second privacy computing device 12 perform management plane interoperability, the first privacy computing device 11 is configured to send a first query request to the second privacy computing device 12, which carries the first identification information of the first privacy computing device 11 and second identification information for a privacy algorithm to be queried.

The second privacy computing device 12 is configured to receive the first query request, and when it is determined that the first identification information is located in stored identification information for compliance devices, send to the first privacy computing device 11 stored information for components included in a sub-algorithm with the second identification information.

The first privacy computing device 11 is further configured to receive the information for components included in the sub-algorithm with the second identification information, and send to the second privacy computing device 12 a loading request for loading the components included in the sub-algorithm with the second identification information.

The second privacy computing device 12 is further configured to receive the loading request, load the components included in the sub-algorithm with the second identification information, and after the loading is successful, send a loading success message to the first privacy computing device 11.

In some embodiments, the first privacy computing device 11 and the second privacy computing device 12 may be devices such as PCs, mobile terminals, servers, etc., which are not specifically limited in the disclosure. The first privacy computing device 11 and the second privacy computing device 12 may be two different devices.

In some embodiments, refer to FIG. 1, the first privacy computing device 11 and the second privacy computing device 12 each store a sub-algorithm of a privacy algorithm. For ease of description, the sub-algorithm stored in the first privacy computing device 11 is referred to as the first sub-algorithm, and the sub-algorithm stored in the second privacy computing device 12 is referred to as the second sub-algorithm. In some embodiments, the first sub-algorithm and the second sub-algorithm may respectively be part of the sub-algorithms included in a same privacy computing product launched by a same technology company. Optionally, the first sub-algorithm and the second sub-algorithm may also be different privacy computing products launched by different technology companies based on different system platforms, etc., which may be flexibly set according to needs and are not limited in the disclosure. For example, taking the first sub-algorithm and the second sub-algorithm as partial sub-algorithms included in the same privacy computing product (e.g., privacy algorithm) launched by the same technology company as an example, the first sub-algorithm stored in the first privacy computing device may be a sub-algorithm that includes a guest part (i.e., the party with label y which is the party for data consumption) in the privacy algorithm, and the second sub-algorithm stored in the second privacy computing device may be a sub-algorithm that includes a host part (i.e., the party without label y which is the party for data supply) in the privacy algorithm.

In some embodiments, the number of second privacy computing devices may be one or multiple. The disclosure does not specifically limit the number of second privacy computing devices, which may be flexibly set according to needs. Whether there is one or more privacy computing devices, for each second privacy computing device, a privacy computing process between the privacy algorithm products stored in the first privacy computing device and in the second privacy computing device during the interconnection and interoperability can adopt the privacy computing process provided by the embodiments of the disclosure, which will not be specifically described here.

Figure 2:
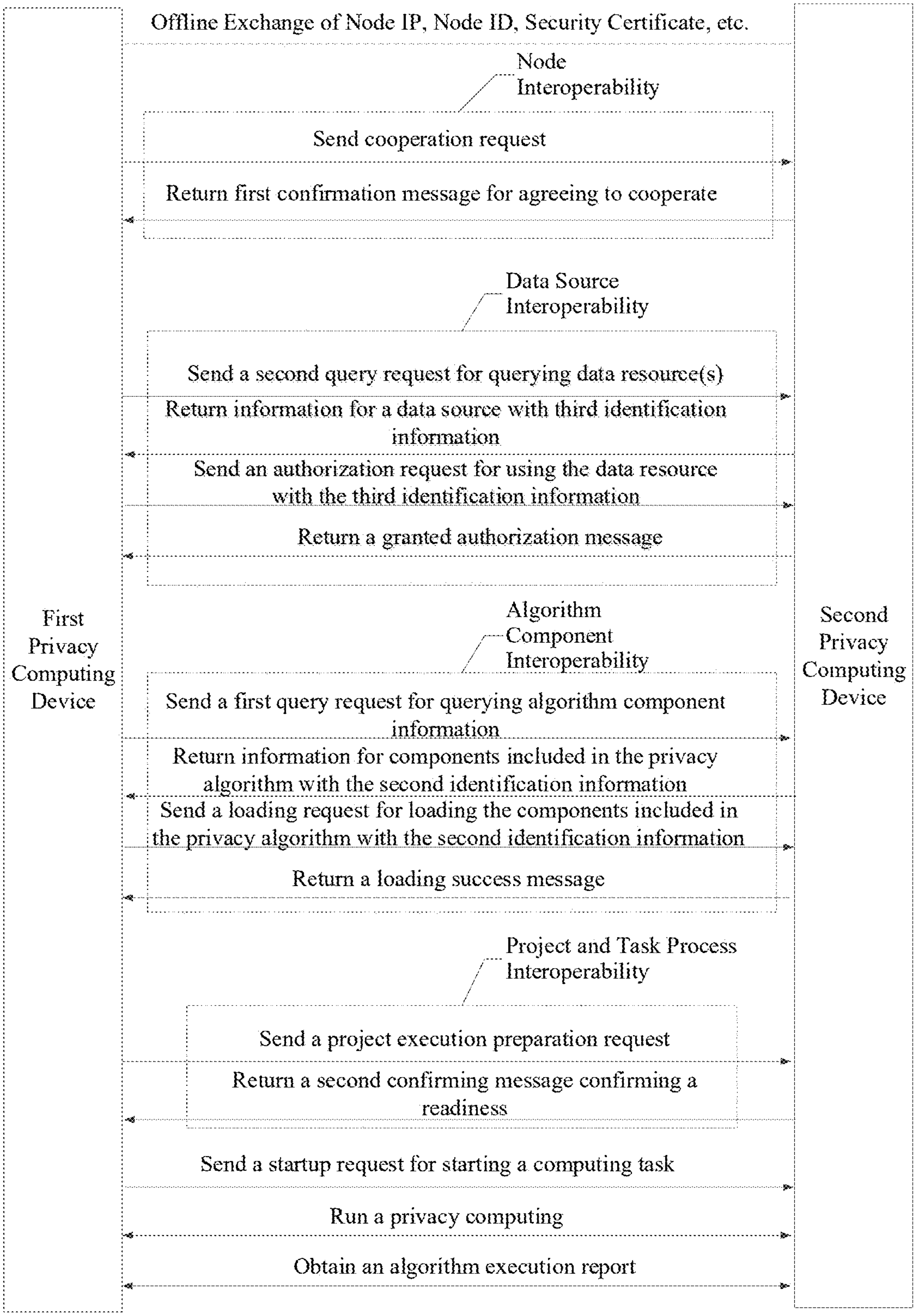
FIG. 2 shows a schematic diagram of a privacy algorithm interconnection and interoperability process according to some embodiments.

In some embodiments, the first sub-algorithm may be stored in the data plane of the first privacy computing device, and the second sub-algorithm may be stored in the data plane of the second privacy computing device. The first privacy computing device and each second privacy computing device respectively collaborate on privacy computing tasks based on management plane interoperability, and may perform the privacy computing tasks based on data plane interoperability, so that the first sub-algorithm stored in the first privacy computing device and the second sub-algorithm stored in the second privacy computing device may be interconnected and interoperated for joint computation. Optionally, management plane interoperability and data plane interoperability between privacy computing devices may be mutually independent. Exemplarily, refer to FIG. 2, which shows a schematic diagram of a privacy algorithm interconnection and interoperability process according to some embodiments. As shown in FIG. 2, in order to achieve interconnection and interoperability between privacy algorithm products stored in different privacy computing devices, in some embodiments, when the first privacy computing device and any second privacy computing device perform management plane interoperability, privacy algorithm developers and others may send to the second privacy computing device 12 offline in advance the Internet protocol (IP) address, identity document (ID) and other identification information (for ease of description, the identification information of the first privacy computing device 11 will be referred to as the first identification information hereinafter) of the first privacy computing device 11. The second privacy computing device 12 may consider the first privacy computing device 11 corresponding to the first identification information as a secure compliance device, and save the first identification information in the identification information for its own compliance devices. At the same time, privacy algorithm developers and others may also send offline in advance the IP address, ID and other identification information of the second privacy computing device 12 (for ease of description, the identification information of the second privacy computing device 12 will be referred to as the second identification information hereinafter) to the first privacy computing device 11. The first privacy computing device 11 may consider the second privacy computing device 12 corresponding to the second identification information as a secure compliance device, and save the second identification information in the identification information for its own compliance devices. In other words, the first privacy computing device 11 and the second privacy computing device 12 may exchange identification information such as node IP and node ID and so on offline.

In some embodiments, in order to increase the flexibility and accuracy of privacy computations, a privacy algorithm such as the first sub-algorithm and the second sub-algorithm may be decoupled to include a scene algorithm and a security algorithm. Here, if a privacy algorithm does not include a security algorithm but just includes a scenario algorithm, a privacy computation may be considered to be a plaintext computation on the to-be-processed data without security encryption protection. If a privacy algorithm includes both a scenario algorithm and a security algorithm, the privacy computation may be considered to be a private computation on the to-be-processed data under secure encryption protection. The scenario algorithm and security algorithm included in a privacy algorithm may be flexibly selected according to needs, which is not limited in the present disclosure.

In some embodiments, the first sub-algorithm may include a first scenario algorithm and a first security algorithm, and the second sub-algorithm may include a second scenario algorithm and a second security algorithm. In order to ensure the security of the interconnection and interoperability between privacy algorithm products stored in different privacy computing devices, in some embodiments, in addition to sending offline in advance the first identification information of the first privacy computing device 11 to the second privacy computing device 12, a security certificate of the first security algorithm included in the first sub-algorithm may also be sent offline in advance to the second privacy computing device 12. The second privacy computing device 12 may save the security certificate and a token of the first sub-algorithm carried by the security certificate (for ease of description, the token carried by the security certificate is referred to as the reference token). Similarly, in addition to sending the second identification information of the second privacy computing device 12 to the first privacy computing device 11 in advance, the security certificate of the second security algorithm included in the second sub-algorithm may also be sent offline in advance to the first privacy computing device 11. The first privacy computing device 11 may save the security certificate and the reference token of the second sub-algorithm carried by the security certificate. In other words, the first privacy computing device 11 and the second privacy computing device 12 may exchange security certificates and the like offline. The purpose of the reference tokens will be described later and will not be specifically described here.

In some embodiments, in order to achieve interconnection and interoperability between privacy algorithm products stored in different privacy computing devices, different privacy algorithm products, that is, sub-algorithms stored in different privacy computing devices, may be configured as an algorithm with a container structure. The algorithm of the container structure may include several algorithm components. Optionally, in order to achieve interconnection and interoperability between privacy algorithm products stored in different privacy computing devices, a process of interoperating between algorithm components (i.e., sub-algorithms) included in different privacy computing products may be performed. Optionally, the process of interoperating between algorithm components may be as follows.

The first privacy computing device 11 may send to the second privacy computing device 12 a first query request for querying algorithm component information (for ease of description, the query request for querying algorithm component information is referred to as a first query request). The first query request may carry the first identification information of the first privacy computing device 11 and the second identification information of the to-be-queried sub-algorithm. If the second privacy computing device 12 receives the first query request, it may then determine whether the first identification information carried in the first query request is located in the pre-stored identification information for compliance devices. If the first identification information is located in the pre-stored identification information for compliance devices, the first privacy computing device 11 with the first identification information may be considered a secure compliance device. Stored information for components included in the sub-algorithm with the second identification information may be sent (or returned) to the first privacy computing device 11.

The first privacy computing device 11 may receive the information for components included in the sub-algorithm (i.e., second sub-algorithm) with the second identification information sent by the second privacy computing device 12 and save it. In some embodiments, before pre-running the first sub-algorithm and the second sub-algorithm, the first privacy computing device 11 may send to the second privacy computing device 12 a loading request for loading components included in the algorithm with the second identification information (i.e., the second sub-algorithm). After receiving the loading request, the second privacy computing device 12 may load the components included in the sub-algorithm with the second identification information (i.e., second sub-algorithm), that is, the second privacy computing device 12 may load the components included in the second sub-algorithm. That is, the components included in the second sub-algorithm are synchronized online. Optionally, after the second privacy computing device 12 successfully loads the components included in the sub-algorithm with the second identification information (i.e., the algorithm components are completely online), a loading success message may be sent (or returned) to the first privacy computing device. This enables the first privacy computing device 11 to learn that the second sub-algorithm in the second privacy computing device 12 has been loaded successfully.

Since the disclosure is directed to each second privacy computing device 12, when the first privacy computing device 11 and each second privacy computing device 12 perform management plane interoperability, the first privacy computing device 11 may send a first query request to the second privacy computing device 12. The first query request carries the first identification information of the first privacy computing device 11 and the second identification information of the to-be-queried sub-algorithm. The second privacy computing device 12 may receive the first query request, and when it is determined that the first identification information is located in the stored identification information for compliance devices, stored information for components included in the sub-algorithm with the second identification information is sent to the first privacy computing device 11. The first privacy computing device 11 receives the information for the components included in the sub-algorithm with the second identification information, and sends a loading request to the second privacy computing device 12 to load the components included in the sub-algorithm with the second identification information. The second privacy computing device 12 may receive the loading request, and load the components included in the sub-algorithm with the second identification information. After the loading is successful, a loading success message is sent to the first privacy computing device 11. In the disclosure, since the first privacy computing device 11 and each second privacy computing device 12 may respectively collaborate on the privacy computing tasks based on the management plan interoperability, and perform the privacy computing tasks based on the data plane interoperability, and the management plane interoperability and data plane interoperability are mutually independent, which then allows the realization of the purpose of interconnection and interoperability between privacy algorithm products stored in different privacy computing devices.

Embodiment 2

In order to ensure the security of the interconnection and interoperability between the first sub-algorithm and the second sub-algorithm, on the basis of the above embodiments, in the embodiments disclosed herein, the first privacy computing device 11 is specifically configured to send the first query request to the second privacy computing device 12 based on a first application programming interface (API).

The second privacy computing device 12 is specifically configured to receive the first query request based on the first API; and based on the first API, send to the first privacy computing device 11 the store information for the components included in the sub-algorithm with the second identification information.

The first privacy computing device 11 is specifically configured to receive, based on the first API, the information for components included in the sub-algorithm with the second identification information; and send a loading request to the second privacy computing device 12 based on a configured second API.

The second privacy computing device 12 is specifically configured to receive the loading request based on the second API, and send the loading success message to the first privacy computing device 11 based on the second API.

In some embodiments, when the first privacy computing device 11 sends the first query request to the second privacy computing device 12, the first privacy computing device 11 may send the first query request to the second privacy computing device 12 based on the configured first API. Here, for ease of description, the API that sends the first query request is referred to as the first API. Optionally, the second privacy computing device 12 may also receive the first query request based on the first API, and when it is determined that the first identification information is located in the stored identification information for compliance devices, send to the first privacy computing device 11 the stored information for components included in the sub-algorithm with the second identification information (i.e., second sub-algorithm) based on the first API. The first privacy computing device 11 may receive, based on the first API, the information for components included in the sub-algorithm with the second identification information (i.e., second sub-algorithm) sent by the second privacy computing device 12.

In addition, when sending the loading request to the second privacy computing device 12, the first privacy computing device 11 may send the loading request to the second privacy computing device 12 based on a configured second API (for ease of description, the API that sends the loading request is referred to as the second API). The second privacy computing device 12 may receive the loading request sent by the first privacy computing device 11 based on the second API, and may send a loading success message to the first privacy computing device 11 based on the second API after the loading is successful. Optionally, the first API and the second API may be representational state transfer (RESTful) API.

In the disclosure, since the first query request, information for components included in the sub-algorithm and other information can be sent based on the configured standard APIs, the security of the interconnection and interoperability between the sub-algorithms may be further improved.

Embodiment 3

In order to improve the security of interconnection and interoperability between sub-algorithms, on the basis of the above embodiments, in the embodiments disclosed herein, the first privacy computing device 11 is further configured to send a cooperation request to the second privacy computing device 12 for sub-algorithm interoperability, where the cooperation request carries the first identification information of the first privacy computing device 11.

The second privacy computing device 12 is further configured to receive the cooperation request, and when it is determined that the first identification information is located in the stored identification information for compliance devices, send to the first privacy computing device 11 a first confirmation message for agreeing to cooperate.

In some embodiments, refer to FIG. 2 again, in order to improve the security of the interconnection and interoperability between sub-algorithms, before the first privacy computing device 11 sends the first query request to the second privacy computing device 12, a cooperation request (or cooperation application) for privacy algorithm interoperability (or interconnection and interoperability) is sent to the second privacy computing device 12. Optionally, the cooperation request may carry the first identification information of the first privacy computing device 11. When the second privacy computing device 12 receives the cooperation request, the second privacy computing device 12 may determine whether the first identification information carried in the cooperation request is located in the pre-stored identification information for compliance devices. If the second privacy computing device 12 determines that the first identification information carried in the cooperation request is located in the identification information for compliance devices stored by itself, the first privacy computing device 11 with the first identification information may be considered to be a secure compliance device. The second privacy computing device 12 may send (or return) the first confirmation message for agreeing to cooperate to the first privacy computing device 11 (for ease of description, the confirmation message for agreeing to cooperate is referred to as the first confirmation message). For ease of description, the subsequent processes in which the first privacy computing device 11 sends the cooperation request and the second privacy computing device 12 sends the first confirmation message for agreeing to cooperate are referred to as node interoperating.

In some embodiments, in order to ensure the security of the interconnection and interoperability between the first sub-algorithm and the second sub-algorithm, when the first privacy computing device 11 sends the cooperation request to the second privacy computing device 12, the first privacy computing device 11 may send the cooperation request to the second privacy computing device 12 based on a configured third API (for ease of description, the API that sends the cooperation request is referred to as the third API). The second privacy computing device 12 may receive the cooperation request sent by the first privacy computing device 11 based on the third API, and may send the first confirmation message based on the third API when it is determined that the first identification information is located in the stored identification information for compliance devices. Optionally, the third API may be a RESTful API.

In the disclosure, since the cooperation request, first confirmation message and other information may be sent based on the configured standard APIs, the security of the interconnection and interoperability between sub-algorithms may be further improved.

Embodiment 4

In order to improve the security of interconnection and interoperability between sub-algorithms, on the basis of the above embodiments, in the embodiments disclosed herein, the first privacy computing device 11 is further configured to send a second query request to the second privacy computing device 12, which carries the first identification information of the first privacy computing device 11 and third identification information of a to-be-queried data resource.

The second privacy computing device 12 is further configured to receive the second query request, and when it is determined that the first identification information is located in the stored identification information for compliance devices, send the stored information for the data resource with the third identification information to the first privacy computing device 11.

In some embodiments, optionally, refer to FIG. 2, in order to interconnect and interoperate privacy algorithm products (i.e., sub-algorithms) stored in different privacy computing devices, when performing management plane interoperability, one may perform a process of interoperating data resources corresponding to different sub-algorithms. Optionally, the process of data resource interoperability may be as follows.

The first privacy computing device 11 may send a second query request for querying a data resource to the second privacy computing device 12 (for ease of description, the query request for querying a data resource is referred to as the second query request). The timing of sending the second query request is not specifically limited in the disclosure and may be flexibly set according to needs. For example, the first privacy computing device 11 may send a cooperation request to the second privacy computing device 12. After receiving a first confirmation message sent by the second privacy computing device 12 for agreeing to cooperate, the first privacy computing device 11 sends a second query request to the second privacy computing device 12. In some embodiments, the second query request may carry the first identification information of the first privacy computing device 11 and the third identification information of the to-be-queried data resource (for ease of description, the identification information for a to-be-queried data resource is referred to as third identification information).

After receiving the second query request, the second privacy computing device 12 may determine whether the first identification information carried in the second query request is located in the pre-stored identification information for compliance devices. If it is determined that the first identification information is located in its own stored identification information for compliance devices, the first privacy computing device 11 corresponding to the first identification information may be considered a secure compliance device. The stored information for the data resource with the third identification information may be sent (or returned) to the first privacy computing device 11. The first privacy computing device 11 may receive and save the information for the data resource with the third identification information, thereby realizing the interoperability of data resources corresponding to different sub-algorithms.

The disclosure may realize the interoperability of data resources corresponding to different sub-algorithms. In this way, the purpose of interconnection and interoperability of different privacy computing products may be achieved.

In addition, the disclosure does not specifically limit the order in which the data resources are interoperated and the algorithm components are interoperated. That is, the data resource interoperability steps may be performed first, or the algorithm component interoperability steps may be performed first, which may be flexibly selected according to needs.

In some embodiments, in order to ensure the security of the interconnection and interoperability between the first sub-algorithm and the second sub-algorithm, when sending the second query request to the second privacy computing device 12, the first privacy computing device 11 may send the second query request to the second privacy computing device 12 through a fourth API (for ease of description, the API that sends the second query request is referred to as the fourth API). The second privacy computing device 12 may receive the second query request sent by the first privacy computing device 11 based on the fourth API. The second privacy computing device 12 may determine that the first identification information is located in the stored identification information for compliance devices, and send the stored data resource information with the third identification information to the first privacy computing device 11 based on the fourth API. Optionally, the fourth API may be a RESTful API.

Since the disclosure may perform the data resource interoperability process based on the configured standard APIs, the security of interoperability between sub-algorithms may be further improved.

Embodiment 5

In order to improve the security of interconnection and interoperability between sub-algorithms, on the basis of the above embodiments, in the embodiments disclosed herein, the first privacy computing device 11 is further configured to send an authorization request to the second privacy computing device 12 for using the data resource with the third identification information, where the authorization request carries the first identification information of the first privacy computing device 11.

The second privacy computing device 12 is further configured to receive the authorization request, and when it is determined that the first identification information is located in the stored identification information for compliance devices, send to the first privacy computing device 11 a granted authorization message for using the data resource with the third identification information.

In some embodiments, in order to enable the first sub-algorithm to use the data resource of the second sub-algorithm and realize interconnection and interoperability between different sub-algorithms, when performing data resource interoperability, after receiving the information for the data resource with the third identification information sent by the second privacy computing device 12, the first privacy computing device 11 may send to the second privacy computing device 12 an authorization request for using the data resource with the third identification information. Optionally, the authorization request may carry the first identification information of the first privacy computing device 11.

After receiving the authorization request, the second privacy computing device 12 may determine whether the first identification information carried in the authorization request is located in the pre-stored identification information for compliance devices. If it is determined that the first identification information is located in the pre-stored identification information for compliance devices, the first privacy computing device 11 corresponding to the first identification information may be considered a secure compliance device. A granted authorization message for authorized use of the data resource with the third identification information may be sent (or return) to the first privacy computing device 11. After receiving the granted authorization message, the first privacy computing device 11 may use the data resource with the third identification information to perform relevant computations. Optionally, the data resource with the third identification information may be metadata, etc.

In the disclosure, since the first privacy computing device 11 may use the data resource with the third identification information after receiving the granted authorization message sent by the second privacy computing device 12, the first sub-algorithm and the second sub-algorithm may be interconnected and interoperated. At the same time, it may also achieve refined control and data security protection of data flow in the privacy computing process.

In some embodiments, in order to ensure the security of the interconnection and interoperability between the first sub-algorithm and the second sub-algorithm, when sending the authorization request to the second privacy computing device 12, the first privacy computing device 11 may send the authorization request to the second privacy computing device 12 based on a configured fifth API (for ease of description, the API that sends the authorization request is referred to as the fifth API). The second privacy computing device 12 may receive the authorization request based on the fifth API, and when it is determined that the first identification information is located in the stored identification information for compliance devices, send a granted authorization message to the first privacy computing device 11 based on the fifth API. Optionally, the fifth API may be a RESTful API.

In the disclosure, since the authorization request, granted authorization message and other information may be sent based on the configured standard APIs, the security of the interconnection and interoperability between sub-algorithms may be further improved.

Embodiment 6

In order to improve the security of interconnection and interoperability between sub-algorithms, on the basis of the above embodiments, in the embodiments disclosed herein, the first privacy computing device 11 is further configured to send a project execution preparation request to the second privacy computing device 12, which carries the first identification information of the first privacy computing device 11, second identification information of the sub-algorithm required for a to-be-run project, and third identification information for a target data resource required for the to-be-run project.

The second privacy computing device 12 is further configured to receive the project execution preparation request, and when it is determined that the first identification information is located in the stored identification information for compliance devices, and when it is determined that the target data resource with the third identification information is saved, and when it is determined that the components included in the sub-algorithm with the second identification information are completely loaded, send a confirmation message confirming a readiness to the first privacy computing device 11.

In some embodiments, before preparing to run the first sub-algorithm and the second sub-algorithm, the first privacy computing device 11 may also send a project execution preparation request to the second privacy computing device 12. In order to make the second privacy computing device 12 learns which sub-algorithm(s) and data resource(s) need to be prepared for the to-be-run project, in addition to the first identification information of the first privacy computing device 11, the project execution preparation request may also carry the second identification information for the sub-algorithm required for the to-be-run project and the third identification information for the target data resource required for the to-be-run project. Here, the sub-algorithm and target data resource carried in the project execution preparation request may be flexibly set according to needs, which is not limited in the present disclosure.

After receiving the project execution preparation request, the second privacy computing device 12 may determine whether the first identification information carried in the project execution preparation request is located in the pre-stored identification information for compliance devices. If it is determined that the first identification information is located in the pre-stored identification information for compliance devices stored by itself, the first privacy computing device 11 corresponding to the first identification information may be considered a secure compliance device. The second privacy computing device 12 may then check whether it currently stores the target data resource with the third identification information and whether the components included in the sub-algorithm with the second identification information are completely loaded. When it is determined that the target data resource with the third identification information is stored and that the components included in the sub-algorithm with the second identification information are completely loaded, the second privacy computing device 12 may send a confirmation message for readiness (for ease of description, it is referred to as the second confirmation message) to the first privacy computing device 11. For ease of description, the process in which the first privacy computing device 11 sends a project execution preparation request to the second privacy computing device 12 and the second privacy computing device 12 sends the second confirmation message confirming a readiness to the first privacy computing device 11 is referred to as a project and task interoperating processes.

In the disclosure, before the project is run, the first privacy computing device 11 may send a project execution preparation request to the second privacy computing device 12, so that the second privacy computing device 12 verifies whether the sub-algorithm and the data resource required to run the project are currently saved, to ensure the smooth execution of the interconnection and interoperability projects between sub-algorithms.

In some embodiments, in order to ensure the security of the interoperability between the first sub-algorithm and the second sub-algorithm, the first privacy computing device 11 may send to the second privacy computing device 12 the project execution preparation request based on a configured sixth API (for ease of description, the API for sending the project execution preparation request is referred to as the sixth API). The second privacy computing device 12 may receive the project execution preparation request based on the sixth API. When it is determined that the first identification information is located in the stored identification information for compliance devices, that the target data source with third identification information is stored, and that the components included in the sub-algorithm with the second identification information are completely loaded, the second privacy computing device 12 may send a second confirmation message to the first privacy computing device 11 based on the sixth API. Optionally, the sixth API may be a RESTful API.

In some embodiments, during the project and task interoperating process, when it is determined that the target data resource with the third identification information is stored, and that the components included in the sub-algorithm with the second identification information are completely loaded, the second privacy computing device 12 may send the second confirmation message confirming a readiness to the first privacy computing device 11. Optionally, the first privacy computing device 11 may receive the second confirmation message, and after receiving the second confirmation message, may perform a process of data plane interoperability with the second privacy computing device 12. In some embodiments, when the first privacy computing device 11 performs data plane interoperability with any second privacy computing device 12, the first privacy computing device 11 may send a startup request for stating a computing task to the second privacy computing device 12. The second privacy computing device 12 may receive the startup request. After receiving the startup request, the second privacy computing device 12 may run the second sub-algorithm according to the privacy algorithm protocol. Optionally, the second privacy computing device 12 may run the sub-algorithm with the second identification information stored in its data plane based on the target data resource with the third identification information. That is, the second privacy computing device 12 runs the second sub-algorithm. It may be understood that when the first privacy computing device 11 sends a startup request to the second privacy computing device 12 so that the second privacy computing device 12 runs the second sub-algorithm, the first privacy computing device 11 may also run the first sub-algorithm stored in its data plane. That is, the first sub-algorithm and the second sub-algorithm may be run at the same time to perform an interconnected and interoperability computation process. In addition, after the execution of the computing task is completed, the first privacy computing device 11 and the second privacy computing device 12 may respectively obtain corresponding algorithm execution reports.

If the node interoperability, data resource interoperability, algorithm component interoperability, project and task process interoperability, and so on provided in the above embodiments are referred to as management plane interoperability, the interconnection and interoperability-based computing process that the first sub-algorithm and the second sub-algorithm start to execute is referred to as data plane interoperability. For example, after the management plane interoperability is completed, the first sub-algorithm and the second sub-algorithm may be run at the same time. When performing the interoperability computation process (data plane interoperability), it is assumed that, when the second privacy computing device 12 where the second sub-algorithm is located sends computing data to the first privacy computing device 11 where the first sub-algorithm is located, a processing instruction to process the computing data based on the first sub-algorithm may be sent at the same time. The processing instruction may carry the token of the second sub-algorithm (for ease of description, a token carried in the processing instruction is referred to as a target token). After the first privacy computing device 11 receives the processing instruction, the gateway of the first privacy computing device 11 may determine the target token carried in the processing instruction. Is the token consistent with the pre-stored reference token of the second sub-algorithm? If consistent, the second computing data may be considered to be sent by a secure compliance device, and it may be considered that the second computing data needs to be recomputed based on the first sub-algorithm stored in the first privacy computing device 11. The first privacy computing device 11 may perform a process of recomputing the second computing data based on the first sub-algorithm. If the target token is inconsistent with the pre-stored reference token of the second sub-algorithm, it may be considered that the second computing data is not sent by a safe and compliance device, and it may be considered that there is no need to compute the second computing data based on the first sub-algorithm. This ensures the security of different sub-algorithms when interconnected and interoperated.

Figure 3:
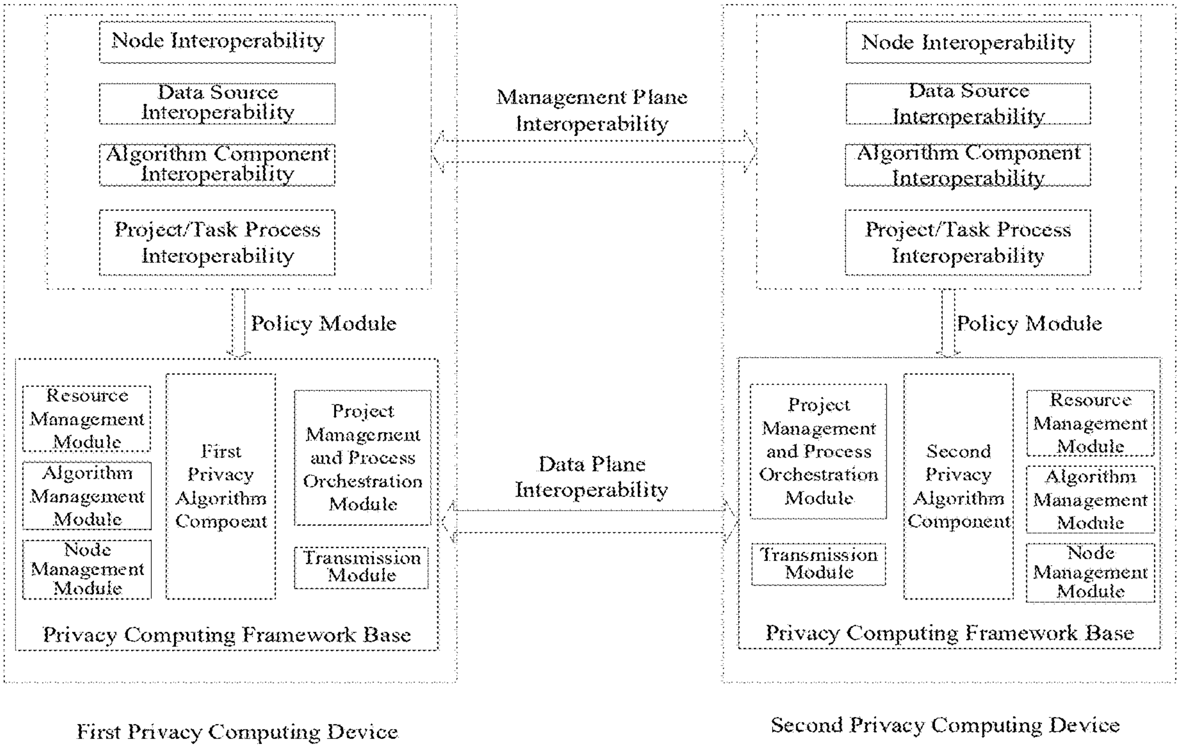
FIG. 3 shows a schematic diagram of another privacy algorithm interconnection and interoperability process according to some embodiments.

To facilitate understanding, the following is an example of the interconnection and interoperability process between the first sub-algorithm and the second sub-algorithm provided in the disclosure through a specific embodiment. FIG. 3 shows a schematic diagram of another sub-algorithm interconnection and interoperability process according to some embodiments. Optionally, task collaboration and data control may be performed between the management plane and the data plane through a policy module. In some embodiments, the first privacy computing device 11 and the second privacy computing device 12 may each include a privacy computing framework base. It may be understood that the structure and principles of running sub-algorithms in the first privacy computing device 11 and the second privacy computing device 12 may be the same. For ease of description, the first privacy computing device 11 is taken as an example for illustration. The policy module of the first privacy computing device 11 may store, the information about the node (also called station) interoperability in the management plane, in the node management module in the privacy computing framework base of the first privacy computing device 11, and may also store, the information about the data resource interoperability in the management plane, in the resource management module in the privacy computing framework base. Information about algorithm component interoperability in the management plane may also be stored in the algorithm management module in the privacy computing framework base. Information about project and task process interoperability in the management plane may also be stored in the project management and process orchestration module in the privacy computing framework base.

The first privacy computing device 11 may implement the management plane interoperability such as node interoperability, data resource interoperability, algorithm component interoperability, and project and task process interoperability in the above embodiments based on the privacy computing engine of the first sub-algorithm. After the management plane interoperability is completed, the first sub-algorithm and the second sub-algorithm may run at the same time. When performing the interoperability computation process (i.e., data plane interoperability), the first privacy computing device 11 may input authorized data into an algorithm container of the first sub-algorithm, and the second privacy computing device 12 may input authorized data into the stored algorithm container of the second sub-algorithm. For example, if the first privacy computing device 11 performs corresponding computation on the to-be-processed data based on the first sub-algorithm and obtains the first computing data, and determines that the first computing data needs to be recomputed based on the second sub-algorithm stored in the second privacy computation device 12, the first privacy computing device 11 may determine a proxy interface corresponding to the first sub-algorithm and a proxy interface corresponding to the second sub-algorithm based on the pre-stored correspondence between sub-algorithms and standard proxy interfaces. The communication module in the first privacy computing device 11 may send the first computing data to the proxy interface of the second privacy computing device 12 (i.e., the proxy interface corresponding to the second sub-algorithm) through the proxy interface corresponding to the first sub-algorithm. The communication module in the second privacy computing device 12 may receive the first computing data based on the proxy interface corresponding to the second sub-algorithm. When it is determined that the first computing data needs to be recomputed based on the second sub-algorithm, the second privacy computing device 12 may perform corresponding computation on the first computing data based on the second sub-algorithm, to realize interconnection and interoperability between the first sub-algorithm and the second sub-algorithm.

Since the disclosure may achieve low coupling between management plane interoperability and data plane interoperability, management plane interoperability and data plane interoperability may be mutually independent, thereby simplifying the implementation of interconnection and interoperability between different privacy computing products (i.e., sub-algorithms). The overall design is conducive to the realization of interconnection and interoperability between privacy algorithm products stored in different privacy computing devices. In addition, the sub-algorithms in the disclosure may be configured as a container structure, so that the sub-algorithm interconnection and interoperability method provided by the disclosure has good compatibility and operability, and may be accepted by most mainstream privacy computing products.

Embodiment 7

Figure 4:
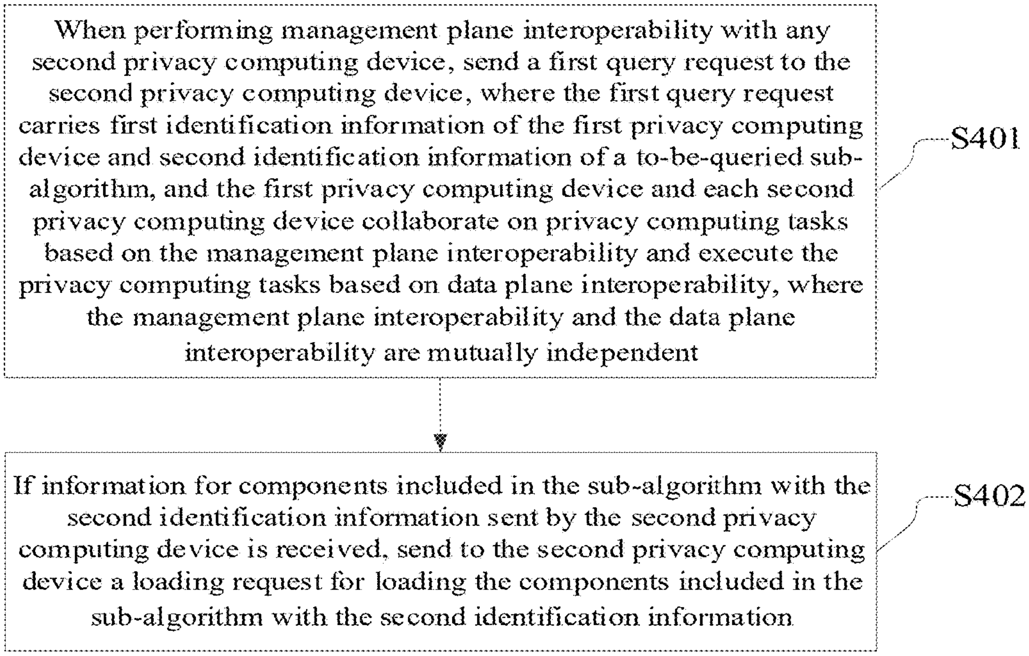
FIG. 4 shows a flowchart of a privacy computation method according to some embodiments.

Based on similar technical concept, the disclosure provides a privacy computing method, which is applied to the first privacy computing device. FIG. 4 shows a flowchart of a privacy computing method according to some embodiments. As shown in FIG. 4, the method includes the following steps.

- S401: When performing management plane interoperability with any second privacy computing device, send a first query request to the second privacy computing device, where the first query request carries first identification information of the first privacy computing device and second identification information of a to-be-queried sub-algorithm, and the first privacy computing device and each second privacy computing device collaborate on privacy computing tasks based on the management plane interoperability and execute the privacy computing tasks based on data plane interoperability, where the management plane interoperability and the data plane interoperability are mutually independent.
- S402: If information for components included in the sub-algorithm with the second identification information sent by the second privacy computing device is received, send to the second privacy computing device a loading request for loading the components included in the sub-algorithm with the second identification information.

In some embodiments, sending the first query request to the second privacy computing device includes: sending the first query request to the second privacy computing device based on a configured first API, and sending the loading request to the second privacy computing device for loading the components included in the sub-algorithm with the second identification information includes: sending the loading request to the second privacy computing device based on a configured second API.

In some embodiments, before sending the first query request to the second privacy computing device, the method further includes: sending a cooperation request for sub-algorithm interoperability to the second privacy computing device, where the cooperation request carries the first identification information of the first privacy computing device.

In some embodiments, sending the cooperation request for sub-algorithm interoperability to the second privacy computing device includes: sending the cooperation request for sub-algorithm interoperability to the second privacy computing device based on a configured third API.

In some embodiments, the method further includes: sending a second query request to the second privacy computing device, where the second query request carries the first identification information of the first privacy computing device and third identification information for a to-be-queried data resource.

In some embodiments, sending the second query request to the second privacy computing device includes: sending the second query request to the second privacy computing device based on a configured fourth API.

In some embodiments, after sending the second query request to the second privacy computing device, the method further includes: sending an authorization request for using the data resource with the third identification information to the second privacy computing device, where the authorization request carries the first identification information of the first privacy computing device.

In some embodiments, sending the authorization request for using the data resource with the third identification information to the second privacy computing device includes: sending the authorization request to the second privacy computing device based on a configured fifth API.

In some embodiments, the method further includes: sending a project execution preparation request to the second privacy computing device, where the project execution preparation request carries the first identification information of the first privacy computing device, second identification information of a sub-algorithm required for a to-be-run project, and third identification information for a target data resource required for the to-be-run project.

In some embodiments, sending the project execution preparation request to the second privacy computing device includes: sending the project execution preparation request to the second privacy computing device based on a configured sixth API.

In some embodiments, the method further includes: when performing data plane interoperability with any second privacy computing device, the first privacy computing device receives a second confirmation message sent by the second privacy computing device, and sends a startup request for starting a computing task to the second privacy computing device.

Figure 5:
FIG. 5 shows a schematic diagram of a privacy computing device according to some embodiments.

Based on similar technical concept, the disclosure provides a privacy computing device, which is applied to the first privacy computing device. FIG. 5 shows a schematic diagram of a privacy computing device according to some embodiments. The device includes: a first transmission module 501, configured to send a first query request to a second privacy computing device when performing management plane interoperability with any second privacy computing device, where the first query request carries the first identification information of the first privacy computing device and the second identification information of a to-be-queried sub-algorithm, the first privacy computing device and each second privacy computing device collaborate on privacy computing tasks based on the management plane interoperability and perform the privacy computing tasks based on data plane interoperability, where the management plane interoperability and the data plane interoperability are mutually independent; and a second transmission module 502, configured to, upon receiving information for components included in the sub-algorithm with the second identification information sent by the second privacy computing device, send a loading request for loading components included in the sub-algorithm with the second identification information to the second privacy computing device.

In some embodiments, the first transmission module 501 is specifically configured to send the first query request to the second privacy computing device based on a configured first API. The second transmission module 502 is specifically configured to send the loading request to the second privacy computing device based on a configured second API.

In some embodiments, the first transmission module 501 is further configured to send a cooperation request for sub-algorithm interoperability to the second privacy computing device, where the cooperation request carries the first identification information of the first privacy computing device.

In some embodiments, the first transmission module 501 is specifically configured to send the cooperation request for sub-algorithm interoperability to the second privacy computing device based on a configured third API.

In some embodiments, the first transmission module 501 is further configured to send a second query request to the second privacy computing device, where the second query request carries the first identification information of the first privacy computing device and third identification information for a to-be-queried data resource.

In some embodiments, the first transmission module 501 is specifically configured to send the second query request to the second privacy computing device based on a configured fourth API.

In some embodiments, the first transmission module 501 is further configured to send an authorization request for using the data resource with the third identification information to the second privacy computing device, where the authorization request carries the first identification information of the first privacy computing device.

In some embodiments, the first transmission module 501 is specifically configured to send the authorization request to the second privacy computing device based on a configured fifth API.

In some embodiments, the first transmission module 501 is further configured to send a project execution preparation request to the second privacy computing device, where the project execution preparation request carries the first identification information of the first privacy computing device, second identification information of a sub-algorithm required for a to-be-run project, and third identification information of a target data resource required for the to-be-run project.

In some embodiments, the first transmission module 501 is specifically configured to send the project execution preparation request to the second privacy computing device based on a configured sixth API.

In some embodiments, the first transmission module 501 is further configured to, when performing the data plane interoperability with any second privacy computing device, and when the first privacy computing device receives a second confirmation message sent by the second privacy computing device, send a startup request to start a computing task to the second privacy computing device.

Embodiment 8

Figure 6:
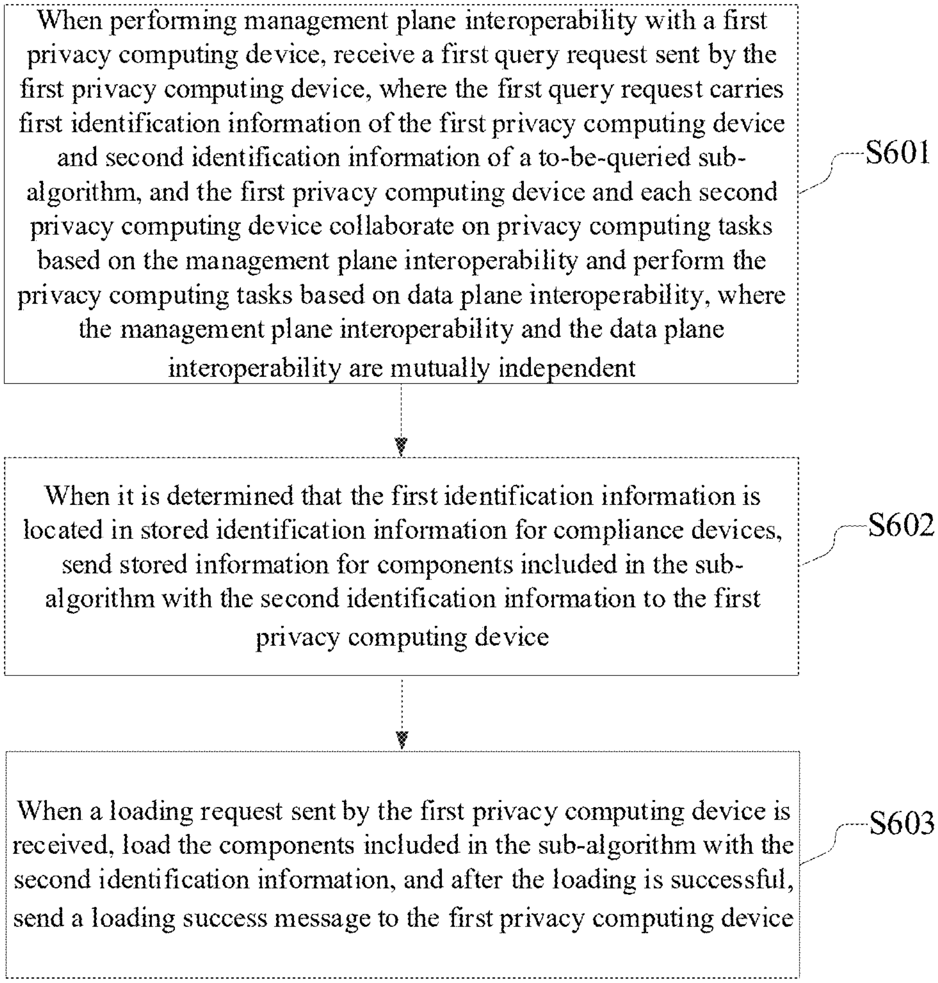
FIG. 6 shows a flowchart of another privacy computation method according to some embodiments.

Based on similar technical concept, the disclosure provides a privacy computing method, which is applied to any second privacy computing device. FIG. 6 shows a flowchart of another privacy computing method according to some embodiments. As shown in FIG. 6, the method includes the following steps.

S601: When performing management plane interoperability with a first privacy computing device, receive a first query request sent by the first privacy computing device, where the first query request carries first identification information of the first privacy computing device and second identification information of a to-be-queried sub-algorithm, and the first privacy computing device and each second privacy computing device collaborate on privacy computing tasks based on the management plane interoperability and perform the privacy computing tasks based on data plane interoperability, where the management plane interoperability and the data plane interoperability are mutually independent.

S602: When it is determined that the first identification information is located in stored identification information for compliance devices, send stored information for components included in the sub-algorithm with the second identification information to the first privacy computing device.

S603: When a loading request sent by the first privacy computing device is received, load the components included in the sub-algorithm with the second identification information, and after the loading is successful, send a loading success message to the first privacy computing device.

In some embodiments, receiving the first query request sent by the first privacy computing device includes: receiving the first query request based on a first API; sending stored information for components included in the sub-algorithm with the second identification information to the first privacy computing device includes: sending the stored information for components included in the sub-algorithm with the second identification information to the first privacy computing device based on the first API; receiving the loading request sent by the first privacy computing device includes: receive the loading request based on a second API; and sending a loading success message to the first privacy computing device includes: sending the loading success message to the first privacy computing device based on the second API.

In some embodiments, before receiving the first query request sent by the first privacy computing device, the method further includes: receiving a cooperation request sent by the first privacy computing device, where the cooperation request carries the first identification information of the first privacy computing device; and when it is determined that the first identification information is located in the stored identification information for compliance devices, send a first confirmation message for agreeing to cooperate to the first privacy computing device.

In some embodiments, receiving the cooperation request sent by the first privacy computing device includes: receiving the cooperation request based on a third API; and sending the first confirmation message for agreeing to cooperate to the first privacy computing device includes: sending the first confirmation message based on the third API.

In some embodiments, the method further includes: receiving a second query request sent by the first privacy computing device, where the second query request carries the first identification information of the first privacy computing device and third identification information of a to-be-queried data resource; and when it is determined that the first identification information is located in the stored identification information for compliance devices, send stored information for the data resource with the third identification information to the first privacy computing device.

In some embodiments, receiving the second query request sent by the first privacy computing device includes: receiving the second query request based on a fourth API; and sending the stored information for the data resource with the third identification information to the first privacy computing device includes: sending the information for the data resource with the third identification information to the first privacy computing device based on the fourth API.

In some embodiments, after receiving the second query request sent by the first privacy computing device, the method further includes: receiving an authorization request sent by the first privacy computing device, where the authorization request carries the first identification information of the first privacy computing device; and when it is determined that the first identification information is located in the stored identification information for compliance devices, send to the first privacy computing device a granted authorization message for authorized use of the data resource with the third identification information.

In some embodiments, receiving the authorization request sent by the first privacy computing device includes: receiving the authorization request based on a fifth API; and sending to the first privacy computing device the granted authorization message for authorized use of the data resource with the third identification information includes: sending the granted authorization message to the first privacy computing device based on the fifth API.

In some embodiments, the method further includes: receiving a project execution preparation request sent by the first privacy computing device, where the project execution preparation request carries the first identification information of the first privacy computing device, second identification information of a sub-algorithm required for a to-be-run project, and third identification information of a target data resource required for the to-be-run project; and when it is determined that the first identification information is located in the stored identification information for compliance devices, and when it is determined that the target data resource with the third identification information is saved, and that the components included in the sub-algorithm with the second identification information are completely loaded, sending a second confirmation message confirming a readiness to the first privacy computing device.

In some embodiments, receiving the project execution preparation request sent by the first privacy computing device includes: receiving the project execution preparation request based on a sixth API; and sending the second confirmation message confirming a readiness to the first privacy computing device includes: sending the second confirmation message to the first privacy computing device based on the sixth API.

In some embodiments, the method further includes: when performing the data plane interoperability with the first privacy computing device, receiving a startup request sent by the first privacy computing device, and running the sub-algorithm with the second identification information based on the target data resource with the third identification information.

Figure 7:
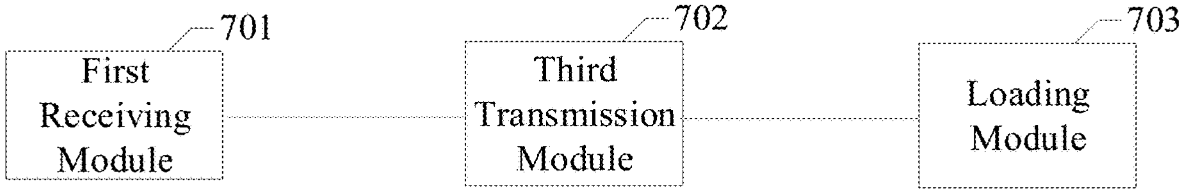
FIG. 7 shows a schematic diagram of another privacy computing device according to some embodiments.

Based on similar technical concept, the disclosure provides a privacy computing device, which is applied to a second privacy computing device. FIG. 7 shows a schematic diagram of another privacy computing device according to some embodiments. The device includes: a first receiving module 701, configured to receive a first query request sent by a first privacy computing device when performing management plane interoperability with the first privacy computing device, where the first query request carries the first identification information of the first privacy computing device and second identification information of a to-be-queried sub-algorithm, and the first privacy computing device and each second privacy computing device collaborate on privacy computing tasks based on the management plane interoperability and perform the privacy computing tasks based on data plane interoperability, where the management plane interoperability and the data plane interoperability are mutually independent; and a third transmission module 702, configured to send stored information for components included in the sub-algorithm with the second identification information to the first privacy computing device when it is determined that the first identification information is located in the stored identification information for compliance devices; and a loading module 703, configured to load the components included in the sub-algorithm with the second identification information upon receiving a loading request sent by the first privacy computing device, and after the loading is successful, send a loading success message to the first privacy computing device.

In some embodiments, the first receiving module 701 is specifically configured to receive the first query request based on a first API; the third transmission module 702 is specifically configured to send to the first privacy computing device the stored information for components included in the sub-algorithm with the second identification information based on the first API; and the loading module 703 is specifically configured to receive the loading request based on a second API, and send the loading success message to the first privacy computing device based on the second API.

In some embodiments, the first receiving module 701 is further configured to receive a cooperation request sent by the first privacy computing device, where the cooperation request carries the first identification information of the first privacy computing device, and when it is determined that the first identification information is located in the stored identification information for compliance devices, send a first confirmation message for agreeing to cooperate to the first privacy computing device.

In some embodiments, the first receiving module 701 is specifically configured to receive the cooperation request based on a third API, and send the first confirmation message based on the third API.

In some embodiments, the first receiving module 701 is further configured to receive a second query request sent by the first privacy computing device, where the second query request carries the first identification information of the first privacy computing device and third identification information of a to-be-queried data resource; when it is determined that the first identification information is located in the stored identification information for compliance devices, send stored information for the data resource with the third identification information to the first privacy computing device.

In some embodiments, the first receiving module 701 is specifically configured to receive the second query request based on a fourth API, and send the information for the data resource with the third identification information to the first privacy computing device based on the fourth API.

In some embodiments, the first receiving module 701 is further configured to receive an authorization request sent by the first privacy computing device, where the authorization request carries the first identification information of the first privacy computing device; and when it is determined that the first identification information is located in the stored identification information for compliance devices, send a granted authorization message for authorized use of the data resource with the third identification information to the first privacy computing device.

In some embodiments, the first receiving module 701 is specifically configured to receive the authorization request based on a fifth API, and send the granted authorization message to the first privacy computing device based on the fifth API.

In some embodiments, the first receiving module 701 is further configured to receive a project execution preparation request sent by the first privacy computing device, where the project execution preparation request carries the first identification information of the first privacy computing device, second identification information of a sub-algorithm required for a to-be-run project, and third identification information of a target data resource required for the to-be-run project; and when it is determined that the first identification information is located in the stored identification information for compliance devices, and when it is determined that the target data resource with the third identification information is saved, and that the components included in the sub-algorithm with the second identification information are completely loaded, send a second confirmation message confirming a readiness to the first privacy computing device.

In some embodiments, the first receiving module 701 is specifically configured to receive the project execution preparation request based on a sixth API, and send the second confirmation message to the first privacy computing device based on the sixth API.

In some embodiments, the first receiving module 701 is further configured to receive a startup request sent by the first privacy computing device when performing the data plane interoperability with the first privacy computing device, and run the sub-algorithm with the second identification information based on the target data resource with the third identification information.

Embodiment 9

Figure 8:
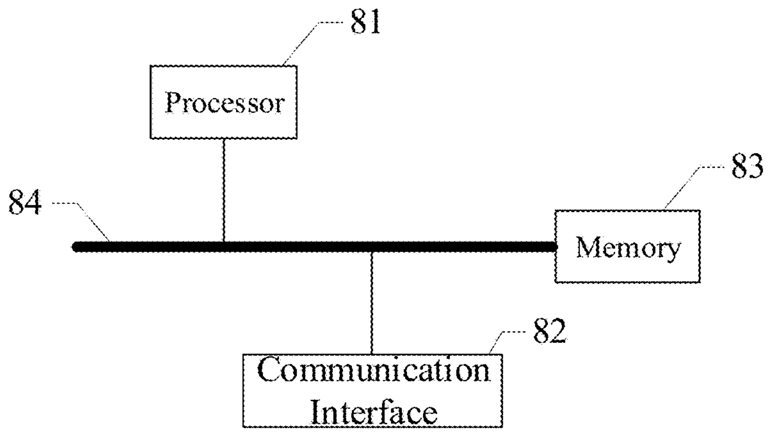
FIG. 8 shows a schematic structural diagram of an electronic device according to some embodiments.

Based on similar technical concept, the disclosure also provides an electronic device. FIG. 8 shows a schematic structural diagram of an electronic device according to some embodiments. As shown in FIG. 8, the electronic device includes: a processor 81, a communication interface 82, a memory 83, and a communication bus 84, where the processor 81, communication interface 82, and memory 83 complete communication with each other through the communication bus 84.

In some embodiments, the memory 83 stores a computer program. When the program is executed by the processor 81, the processor 81 performs the following steps.

When performing management plane interoperability with any second privacy computing device, send a first query request to the second privacy computing device, where the first query request carries first identification information of a first privacy computing device and second identification information for a to-be-queried sub-algorithm, and the first privacy computing device and each second privacy computing device collaborate on privacy computing tasks based on the management plane interoperability and perform the privacy computing tasks based on data plane interoperability, where the management plane interoperability and the data plane interoperability are mutually independent.

If information for components included in the sub-algorithm with the second identification information sent by the second privacy computing device is received, send a load request for loading components included in the sub-algorithm with the second identification information to the second privacy computing device.

In some embodiments, the processor 81 is specifically configured to send the first query request to the second privacy computing device based on a configured first API, where sending a loading request to the second privacy computing device for loading the components included in the sub-algorithm with the second identification information includes: sending the loading request to the second privacy computing device based on a configured second API.

In some embodiments, the processor 81 is further configured to send a cooperation request for sub-algorithm interoperability to the second privacy computing device before sending the first query request to the second privacy computing device, where the cooperation request carries the first identification information of the first privacy computing device.

In some embodiments, the processor 81 is specifically configured to send the cooperation request for sub-algorithm interoperability to the second privacy computing device based on a configured third API.

In some embodiments, the processor 81 is further configured to send a second query request to the second privacy computing device, where the second query request carries the first identification information of the first privacy computing device and third identification information of a to-be-queried data resource.

In some embodiments, the processor 81 is specifically configured to send the second query request to the second privacy computing device based on a configured fourth API.

In some embodiments, the processor 81 is further configured to, after sending the second query request to the second privacy computing device, send an authorization request for using a data resource with third identification information to the second privacy computing device, where the authorization request carries the first identification information of the first privacy computing device.

In some embodiments, the processor 81 is specifically configured to send the authorization request to the second privacy computing device based on a configured fifth API.

In some embodiments, the processor 81 is further configured to send a project execution preparation request to the second privacy computing device, where the project execution preparation request carries the first identification information of the first privacy computing device, second identification information of a sub-algorithm required for a to-be-run project, and third identification information of a target data resource required for the to-be-run project.

In some embodiments, the processor 81 is specifically configured to send the project execution preparation request to the second privacy computing device based on a configured sixth API.

In some embodiments, the processor 81 is further configured to: when performing the data plane interoperability with any second privacy computing device, and when the first privacy computing device receives a second confirmation message sent by the second privacy computing device, send a startup request to start a computing task to the second privacy computing device.

In addition, in some embodiments, the memory 83 stores a computer program. When the program is executed by the processor 81, the processor 81 performs the following processes.

When performing management plane interoperability with a first privacy computing device, receive a first query request sent by the first privacy computing device, where the first query request carries first identification information of the first privacy computing device and second identification information for a to-be-queried sub-algorithm, and the first privacy computing device and each second privacy computing device collaborate on privacy computing tasks based on the management plane interoperability and execute the privacy computing tasks based on data plane interoperability, where the management plane interoperability and the data plane interoperability are mutually independent.

When it is determined that the first identification information is located in the stored identification information for compliance devices, send stored information for components included in the sub-algorithm with the second identification information to the first privacy computing device.

If a loading request sent by the first privacy computing device is received, the components included in the sub-algorithm with the second identification information are completely loaded, and after the loading is successful, send a loading success message to the first privacy computing device.

In some embodiments, the processor 81 is specifically configured to receive the first query request based on a first API, send stored information for components included in the sub-algorithm with the second identification information to the first privacy computing device based on the first API; receive the loading request based on a second API, and send the loading success message to the first privacy computing device based on the second API.

In some embodiments, the processor 81 is further configured to receive a cooperation request sent by the first privacy computing device before receiving the first query request sent by the first privacy computing device, where the cooperation request carries the first identification information of the first privacy computing device. When it is determined that the first identification information is located in the stored identification information for compliance devices, send a first confirmation message for agreeing to cooperate to the first privacy computing device.

In some embodiments, the processor 81 is specifically configured to receive the cooperation request based on a third API; and send the first confirmation message based on the third API.

In some embodiments, the processor 81 is further configured to receive a second query request sent by the first privacy computing device, where the second query request carries the first identification information of the first privacy computing device and third identification information of a to-be-queried data resource. When it is determined that the first identification information is located in the stored identification information for compliance devices, send stored information for the data resource with the third identification information to the first privacy computing device.

In some embodiments, the processor 81 is specifically configured to receive the second query request based on a fourth API, where sending the stored information for the data resource with the third identification information to the first privacy computing device includes: sending the information for the data resource with the third identification information to the first privacy computing device based on the fourth API.

In some embodiments, the processor 81 is further configured to receive an authorization request sent by the first privacy computing device after receiving the second query request sent by the first privacy computing device, where the authorization request carries the first identification information of the first privacy computing device. When it is determined that the first identification information is located in the stored identification information for compliance devices, send to the first privacy computing device a granted authorization message for authorized use of the data resource with the third identification information.

In some embodiments, the processor 81 is specifically configured to receive the authorization request based on a fifth API; and send the granted authorization message to the first privacy computing device based on the fifth API.

In some embodiments, the processor 81 is further configured to receive a project execution preparation request sent by the first privacy computing device, where the project execution preparation request carries the first identification information of the first privacy computing device, second identification information of a sub-algorithm required for a to-be-run project, and third identification information of a target data resource required for the to-be-run project. When it is determined that the first identification information is located in the stored identification information for compliance devices, and when it is determined that the target data resource with the third identification information is saved, and that the components included in the sub-algorithm with the second identification information are completely loaded, send a second confirmation message confirming a readiness to the first privacy computing device.

In some embodiments, the processor 81 is specifically configured to receive the project execution preparation request based on a sixth API; and send the second confirmation message to the first privacy computing device based on the sixth API.

In some embodiments, the processor 81 is further configured to receive a startup request sent by the first privacy computing device when performing the data plane interoperability with the first privacy computing device, and run the sub-algorithm with the second identification information based on the target data resource with the third identification information.

Since the problem-solving principle of the above electronic device is similar to that of the privacy computing method, the implementation of the electronic device may refer to the implementation of the privacy computing method, details of which will not be repeated here.

The communication bus mentioned in the electronic device may be a peripheral component interconnect (PCI) bus or an extended industry standard architecture (EISA) bus, etc. The communication bus may be divided into address bus, data bus, control bus, etc. For ease of presentation, just one thick line is used in the figure, but it does not mean that there is just one bus or one type of bus.

The communication interface 82 is used for communication between the electronic device and other devices.

The memory may include random access memory (RAM) or non-volatile memory (NVM), such as at least one disk memory. Optionally, the memory may also be at least one storage device located remotely from the processor.

The processor may be a general-purpose processor, including a central processing unit, a network processor (NP), etc. The processor may also be a digital instruction processor (DSP), an application-specific integrated circuit, a field programmable gate array, or other programmable logic devices, discrete gate or transistor logic devices, discrete hardware components, etc.

Based on similar technical concept, embodiments of the disclosure provide a computer-readable storage medium. The computer-readable storage medium stores a computer program that may be executed by an electronic device. When the program is run on the electronic device, the electronic device is caused to execute the following processes.

When performing management plane interoperability with any second privacy computing device, send a first query request to the second privacy computing device, where the first query request carries first identification information of the first privacy computing device and second identification information for a to-be-queried sub-algorithm, and the first privacy computing device and each second privacy computing device collaborate on privacy computing tasks based on the management plane interoperability and perform the privacy computing tasks based on data plane interoperability, where the management plane interoperability and the data plane interoperability are mutually independent.

If information for components included in the sub-algorithm with the second identification information sent by the second privacy computing device is received, send to the second privacy computing device a load request for loading components included in the sub-algorithm with the second identification information.

In some embodiments, sending the first query request to the second privacy computing device includes: sending the first query request to the second privacy computing device based on a configured first API; and sending the loading request to the second privacy computing device for loading the components included in the sub-algorithm with the second identification information includes: sending the loading request to the second privacy computing device based on a configured second API.

In some embodiments, before sending the first query request to the second privacy computing device, the method further includes: sending a cooperation request for sub-algorithm interoperability to the second privacy computing device, where the cooperation request carries the first identification information of the first privacy computing device.

In some embodiments, sending the cooperation request for sub-algorithm interoperability to the second privacy computing device includes: sending the cooperation request for sub-algorithm interoperability to the second privacy computing device based on a configured third API.

In some embodiments, the method further includes: sending a second query request to the second privacy computing device, where the second query request carries the first identification information of the first privacy computing device and the third identification information of a to-be-queried data resource.

In some embodiments, sending the second query request to the second privacy computing device includes: sending the second query request to the second privacy computing device based on a configured fourth API.

In some embodiments, after sending the second query request to the second privacy computing device, the method further includes: sending an authorization request for using the data resource with the third identification information to the second privacy computing device, where the authorization request carries the first identification information of the first privacy computing device.

In some embodiments, sending the authorization request for using the data resource with the third identification information to the second privacy computing device includes: sending the authorization request to the second privacy computing device based on a configured fifth API.

In some embodiments, the method further includes: sending a project execution preparation request to the second privacy computing device, where the project execution preparation request carries the first identification information of the first privacy computing device, second identification information for a sub-algorithm required for a to-be-run project, and third identification information for a target data resource required for the to-be-run project.

In some embodiments, sending the project execution preparation request to the second privacy computing device includes: sending the project execution preparation request to the second privacy computing device based on a configured sixth API.

In some embodiments, the method further includes: when performing the data plane interoperability with any second privacy computing device, the first privacy computing device receives the second confirmation message sent by the second privacy computing device, and sends a startup request for starting a computing task to the second privacy computing device.

In addition, when the program is run on an electronic device, the electronic device is caused to execute the following processes.

When performing management plane interoperability with a first privacy computing device, receive a first query request sent by the first privacy computing device, where the first query request carries first identification information of the first privacy computing device and second identification information for a to-be-queried sub-algorithm, and the first privacy computing device and each second privacy computing device collaborate on privacy computing tasks based on the management plane interoperability and execute the privacy computing tasks based on data plane interoperability, where the management plane interoperability and the data plane interoperability are mutually independent.

When it is determined that the first identification information is located in the stored identification information for compliance devices, send stored information for components included in the sub-algorithm with the second identification information to the first privacy computing device.

If a loading request sent by the first privacy computing device is received, the components included in the sub-algorithm with the second identification information are completely loaded, and after the loading is successful, send a loading success message to the first privacy computing device.

In some embodiments, receiving the first query request sent by the first privacy computing device includes: receiving the first query request based on a first API; sending the stored information for components included in the sub-algorithm with the second identification information to the first privacy computing device includes: sending the stored information for components included in the sub-algorithm with the second identification information to the first privacy computing device based on the first API; receiving the loading request sent by the first privacy computing device includes: receiving the loading request based on a second API; and sending a loading success message to the first privacy computing device includes: sending the loading success message to the first privacy computing device based on the second API.

In some embodiments, before receiving the first query request sent by the first privacy computing device, the method further includes: receiving a cooperation request sent by the first privacy computing device, where the cooperation request carries first identification information of the first privacy computing device; and when it is determined that the first identification information is located in the stored identification information for compliance devices, sending a first confirmation message for agreeing to cooperate to the first privacy computing device.

In some embodiments, receiving the cooperation request sent by the first privacy computing device includes: receiving the cooperation request based on a third API; and sending to the first privacy computing device the first confirmation message for agreeing to cooperate includes: sending the first confirmation message based on the third API.

In some embodiments, the method further includes: receiving a second query request sent by the first privacy computing device, where the second query request carries the first identification information of the first privacy computing device and third identification information of a to-be-queried data resource; and when it is determined that the first identification information is located in the stored identification information for compliance devices, sending stored information for the data resource with the third identification information to the first privacy computing device.

In some embodiments, receiving the second query request sent by the first privacy computing device includes: receiving the second query request based on a fourth API; and sending to the first privacy computing device the stored information for the data resource information with the third identification information includes: sending to the first privacy computing device the stored information for the data resource information with the third identification information based on the fourth API.

In some embodiments, after receiving the second query request sent by the first privacy computing device, the method further includes: receiving an authorization request sent by the first privacy computing device, where the authorization request carries the first identification information of the first privacy computing device; and when it is determined that the first identification information is located in the stored identification information for compliance devices, sending a granted authorization message for authorized use of the data resource with the third identification information to the first privacy computing device.

In some embodiments, receiving the authorization request sent by the first privacy computing device includes: receiving the authorization request based on a fifth API; and sending to the first privacy computing device the granted authorization message for authorized use of the data resource with the third identification information includes: sending the granted authorization message to the first privacy computing device based on the fifth API.

In some embodiments, the method further includes: receiving a project execution preparation request sent by the first privacy computing device, where the project execution preparation request carries the first identification information of the first privacy computing device, second identification information of a sub-algorithm required for a to-be-run project, and third identification information of a target data resource required for the to-be-run project; and when it is determined that the first identification information is located in the stored identification information for compliance devices, and when it is determined that the target data resource with the third identification information is saved, and that the components included in the sub-algorithm with the second identification information are completely loaded, send a second confirmation message confirming a readiness to the first privacy computing device.

In some embodiments, receiving the project execution preparation request sent by the first privacy computing device includes: receiving the project execution preparation request based on a sixth API; and sending the second confirmation message confirming a readiness to the first privacy computing device includes: sending the second confirmation message to the first privacy computing device based on the sixth API.

In some embodiments, the method further includes: when performing data plane interoperability with the first privacy computing device, receiving a startup request sent by the first privacy computing device, and run the sub-algorithm with the second identification information based on the target data resource with the third identification information.

Since the problem-solving principle of the above computer-readable storage medium is similar to the privacy computing method, the implementation of the computer-readable storage medium may refer to the implementation of the privacy computing method, details of which will not be repeated here.

The aforementioned computer-readable storage media may be any available media or data storage devices that may be accessed by the processor in the electronic device, including but not limited to magnetic memories such as floppy disks, hard disks, magnetic tapes, magneto-optical (MO) disks, etc., and optical memories such as CD, DVD, blue-ray disc (BD), holographic versatile disc (HVD), etc., as well as semiconductor memories such as ROM, EPROM, EEPROM, non-volatile memory (NAND FLASH), solid state drive (SSD), etc.

Based on similar technical concept and on the basis of the above embodiments, the disclosure provides a computer program product. The computer program product includes: computer program code. When the computer program code is run on a computer, the computer perform the steps of the privacy computation method as described elsewhere herein.

Those skilled in the art will understand that embodiments of the disclosure may be provided as methods, systems, or computer program products. Accordingly, the disclosure may take the form of an entirely hardware embodiment, an entirely software embodiment, or an embodiment that combines software and hardware aspects. Furthermore, the disclosure may take the form of a computer program product embodied on one or more computer-usable storage media (including, but not limited to, disk memory, CD-ROM, optical storage, etc.) having computer-usable program code embodied therein.

The disclosure is described with reference to flowchart illustrations and/or block diagrams of methods, apparatus (systems), and computer program products according to the disclosure. It will be understood that each process and/or block in the flowchart illustrations and/or block diagrams, and combinations of processes and/or blocks in the flowchart illustrations and/or block diagrams, may be implemented by computer program instructions. These computer program instructions may be provided to a processor of a general purpose computer, special purpose computer, embedded processor, or another programmable data processing device to produce a machine, such that the instructions executed by the processor of the computer or other programmable data processing device produce a device for realizing the functions specified in one process or multiple processes of the flowchart and/or one block or multiple blocks of the block diagram.

These computer program instructions may also be stored in a computer-readable memory that causes a computer or other programmable data processing apparatus to operate in a particular manner, such that the instructions stored in the computer-readable memory produce an article of manufacture including the instruction means, where the instructions means implements the functions specified in a process or processes of the flowchart and/or a block or blocks of the block diagram.

These computer program instructions may also be loaded onto a computer or other programmable data processing device, causing a series of operating steps to be performed on the computer or other programmable device to produce computer-implemented processing, thereby executing on the computer or other programmable device. Instructions provide steps for implementing the functions specified in a process or processes of a flowchart diagram and/or a block or blocks of a block diagram. Apparently, those skilled in the art may make various changes and modifications to the present disclosure without departing from the spirit and scope of the present disclosure. Accordingly, if these modifications and variations of the present disclosure fall within the scope of the claims of the present disclosure and equivalent technologies, the present disclosure is also intended to include these modifications and variations.

What is claimed is:

1. A privacy computing system, comprising: a first privacy computing device comprising a first processor and at least one second privacy computing device each comprising a second processor, wherein:

the first privacy computing device and a second privacy computing device collaborate on privacy computing tasks based on management plane interoperability and execute the privacy computing tasks based on data plane interoperability, wherein the management plane interoperability and the data plane interoperability are mutually independent;

for the second privacy computing device, when the first privacy computing device and the second privacy computing device perform the management plane interoperability, the first processor of the first privacy computing device is configured to send a first query request to the second privacy computing device, wherein the first query request carries first identification information of the first privacy computing device and second identification information of a target sub-algorithm to be queried, wherein a sub-algorithm is a privacy computing product stored on a privacy computing device and configured as an algorithm with a container structure;

the second processor of the second privacy computing device is configured to receive the first query request, and when it is determined that the first identification information is located in stored identification information for compliance devices, send stored information for components included in the target sub-algorithm with the second identification information to the first privacy computing device;

the first processor of the first privacy computing device is further configured to receive the information for components included in the target sub-algorithm with the second identification information, and send, to the second privacy computing device, a loading request for loading the components included in the target sub-algorithm with the second identification information;

the second processor of the second privacy computing device is further configured to receive the loading request, load the components included in the target sub-algorithm with the second identification information, and after the loading is successful, send a loading success message to the first privacy computing device;

when the first privacy computing device and the second privacy computing device perform the data plane interoperability, the first processor of the first privacy computing device is further configured to send to the second privacy computing device a startup request to start a computing task with the target sub-algorithm;

the second processor of the second privacy computing device is further configured to receive the startup request, locally run the target sub-algorithm with the second identification information based on target data resource with third identification information, and send, to the first privacy computing device, an execution report about the running of the target sub-algorithm based on the target data resource;

the second processor of the second privacy computing device is further configured to send, to the first privacy computing device, computing data obtained from the target sub-algorithm and a processing instruction to process the computing data based on the first sub-algorithm, wherein the processing instruction carries a token of the target sub-algorithm; and the first processor of the first privacy computing device is further configured to receive the processing instruction, determine whether the token of the target sub-algorithm is consistent with a pre-stored reference token of the target sub-algorithm, and process the computing data by using the first sub-algorithm in response to determining that the token of the target sub-algorithm is consistent with the pre-stored reference token.

2. The system according to claim 1, wherein:

the first processor of the first privacy computing device is further configured to send the first query request to the second privacy computing device based on a configured first application programming interface (API);

the second processor of the second privacy computing device is further configured to receive the first query request based on the first API, and send the stored information for components included in the target sub-algorithm with the second identification information to the first privacy computing device based on the first API;

the first processor of the first privacy computing device is further configured to receive, based on the first API, the information for components included in the target sub-algorithm with the second identification information, and send the loading request to the second privacy computing device based on a configured second API; and the second processor of the second privacy computing device is further configured to receive the loading request based on the second API, and send the loading success message to the first privacy computing device based on the second API.

3. The system according to claim 1, wherein:

the first processor of the first privacy computing device is further configured to send a cooperation request for privacy algorithm interoperability to the second privacy computing device, wherein the cooperation request carries the first identification information of the first privacy computing device; and the second processor of the second privacy computing device is further configured to receive the cooperation request, and when it is determined that the first identification information is located in the stored identification information for compliance devices, send to the first privacy computing device a first confirmation message for agreeing to cooperate.

4. The system according to claim 3, wherein:

the first processor of the first privacy computing device is further configured to send the cooperation request for privacy algorithm interoperability to the second privacy computing device based on a configured third API; and the second processor of the second privacy computing device is further configured to receive the cooperation request and send the first confirmation message based on the third API.

5. The system according to claim 1, wherein:

the first processor of the first privacy computing device is further configured to send a second query request to the second privacy computing device, wherein the second query request carries the first identification information of the first privacy computing device and the third identification information of the target data resource to be queried; and the second processor of the second privacy computing device is further configured to receive the second query request, and when it is determined that the first identification information is located in the stored identification information for compliance devices, send to the first privacy computing device stored information for the target data source with the third identification information.

6. The system according to claim 5, wherein:

the first processor of the first privacy computing device is further configured to send the second query request to the second privacy computing device based on a configured fourth API; and the second processor of the second privacy computing device is further configured to receive the second query request and send the information for the target data resource with the third identification information based on the fourth API.

7. The system according to claim 5, wherein:

the first processor of the first privacy computing device is further configured to send to the second privacy computing device an authorization request for using the target data resource with the third identification information, wherein the authorization request carries the first identification information of the first privacy computing device; and the second processor of the second privacy computing device is further configured to receive the authorization request, and when it is determined that the first identification information is located in the stored identification information for compliance devices, send to the first privacy computing device a granted authorization message for authorized use of the target data resource with the third identification information.

8. The system according to claim 7, wherein:

the first processor of the first privacy computing device is further configured to send the authorization request to the second privacy computing device based on a configured fifth API; and the second processor of the second privacy computing device is further configured to receive the authorization request and send the granted authorization message based on the fifth API.

9. The system according to claim 1, wherein:

the first processor of the first privacy computing device is further configured to send a project execution preparation request to the second privacy computing device, wherein the project execution preparation request carries the first identification information of the first privacy computing device, the second identification information of the target sub-algorithm required for the computing task of a to-be-run project, and the third identification information of the target data resource required for the to-be-run project; and the second processor of the second privacy computing device is further configured to receive the project execution preparation request, and when it is determined that the first identification information is located in the stored identification information for compliance devices, and when it is determined that the target data resource of the third identification information is stored, and when it is determined that the components included in the target sub-algorithm with the second identification information are completely loaded, sent to the first privacy computing device a second confirmation message confirming a readiness.

10. The system according to claim 9, wherein:

the first processor of the first privacy computing device is further configured to send the project execution preparation request to the second privacy computing device based on a configured sixth API; and the second processor of the second privacy computing device is further configured to receive the project execution preparation request and send the second confirmation message to the first privacy computing device based on the sixth API.

11. The system according to claim 1, wherein:

the first processor of the first privacy computing device is further configured to run a first sub-algorithm at a data plane of the first privacy computing device, wherein the first sub-algorithm and the target sub-algorithm are run at the same time to perform an interconnected and interoperability computation process.

12. The system according to claim 1, wherein:

the target sub-algorithm comprises a scene algorithm and a security algorithm;

the second identification information of the target sub-algorithm and a security certificate of the security algorithm are obtained by the first privacy computing device offline in advance; and a token carried in the security certificate of the security algorithm obtained by the first privacy computing device is the pre-stored reference token of the target sub-algorithm.

13. A privacy computing method, applied to a computing system comprising a first privacy computing device and a second privacy computing device that collaborate on privacy computing tasks based on management plane interoperability and execute the privacy computing tasks based on data plane interoperability, the management plane interoperability and the data plane interoperability being mutually independent, the method comprising:

for the second privacy computing device, when the first privacy computing device and the second privacy computing device perform the management plane interoperability, sending, by a first processor of the first privacy computing device, a first query request to the second privacy computing device, wherein the first query request carries first identification information of the first privacy computing device and second identification information of a target sub-algorithm to be queried, wherein a sub-algorithm is a privacy computing product stored on a privacy computing device and configured as an algorithm with a container structure;

receiving, by a second processor of the second privacy computing device, the first query request, and when it is determined that the first identification information is located in stored identification information for compliance devices, sending stored information for components included in the target sub-algorithm with the second identification information to the first privacy computing device;

receiving, by the first processor of the first privacy computing device, the information for components included in the target sub-algorithm with the second identification information, and sending, to the second privacy computing device, a loading request for loading the components included in the target sub-algorithm with the second identification information;

receiving, by the second processor of the second privacy computing device, the loading request, loading the components included in the target sub-algorithm with the second identification information, and after the loading is successful, sending a loading success message to the first privacy computing device;

when the first privacy computing device and the second privacy computing device perform the data plane interoperability, sending, by the first processor of the first privacy computing device to the second privacy computing device, a startup request to start a computing task with the target sub-algorithm;

receiving, by the second processor of the second privacy computing device, the startup request, locally running the target sub-algorithm with the second identification information based on target data resource with third identification information, and sending, to the first privacy computing device, an execution report about the running of the target sub-algorithm based on the target data resource;

sending, by the second processor of the second privacy computing to the first privacy computing device, computing data obtained from the target sub-algorithm and a processing instruction to process the computing data based on the first sub-algorithm, wherein the processing instruction carries a token of the target sub-algorithm; and receiving, by the first processor of the first privacy computing device, the processing instruction, determining whether the token of the target sub-algorithm is consistent with a pre-stored reference token of the target sub-algorithm, and processing the computing data by using the first sub-algorithm in response to determining that the token of the target sub-algorithm is consistent with the pre-stored reference token.

14. The method according to claim 13, further comprising:

sending, by the first privacy computing device, the first query request to the second privacy computing device based on a configured first application programming interface (API);

receiving, by the second privacy computing device, the first query request based on the first API, and send the stored information for components included in the target sub-algorithm with the second identification information to the first privacy computing device based on the first API; and receiving, by the first privacy computing device, based on the first API, the information for components included in the target sub-algorithm with the second identification information, and send the loading request to the second privacy computing device based on a configured second API; and receiving, by the second privacy computing device, the loading request based on the second API, and send the loading success message to the first privacy computing device based on the second API.

15. The method according to claim 13, further comprising:

sending, by the first privacy computing device, a cooperation request for privacy algorithm interoperability to the second privacy computing device, wherein the cooperation request carries the first identification information of the first privacy computing device; and receiving, by the second privacy computing device, the cooperation request, and when it is determined that the first identification information is located in the stored identification information for compliance devices, sending to the first privacy computing device a first confirmation message for agreeing to cooperate.

16. The method according to claim 15, further comprising:

sending, by the first privacy computing device, the cooperation request for privacy algorithm interoperability to the second privacy computing device based on a configured third API; and receiving, by the second privacy computing device, the cooperation request and sending the first confirmation message based on the third API.

17. The method according to claim 13, further comprising:

sending, by the first privacy computing device, a second query request to the second privacy computing device, wherein the second query request carries the first identification information of the first privacy computing device and the third identification information of the target data resource to be queried; and receiving, by the second privacy computing device, the second query request, and when it is determined that the first identification information is located in the stored identification information for compliance devices, sending to the first privacy computing device stored information for the target data source with the third identification information.

18. The method according to claim 17, further comprising:

sending, by the first privacy computing device, the second query request to the second privacy computing device based on a configured fourth API; and receiving, by the second processor, the second query request and sending the information for the target data resource with the third identification information based on the fourth API.

19. The method according to claim 17, further comprising:

sending, by the first privacy computing device to the second privacy computing device, an authorization request for using the target data resource with the third identification information, wherein the authorization request carries the first identification information of the first privacy computing device; and receiving, by the second privacy computing device, the authorization request, and when it is determined that the first identification information is located in the stored identification information for compliance devices, sending to the first privacy computing device a granted authorization message for authorized use of the target data resource with the third identification information.

20. The method according to claim 19, further comprising:

sending, by the first privacy computing device, the authorization request to the second privacy computing device based on a configured fifth API; and receiving, by the second privacy computing device, the authorization request and sending the granted authorization message based on the fifth API.

* * * * *